(12) United States Patent
Montesanto et al.

(10) Patent No.: US 6,498,891 B1
(45) Date of Patent: Dec. 24, 2002

(54) FBG STRETCHING MECHANISM WITH INTEGRATED THERMAL COMPENSATION

(75) Inventors: Steve Montesanto, Palo Alto, CA (US); Gershon Perelman, Cupertino, CA (US); William Wang, Pleasanton, CA (US)

(73) Assignee: Phaethon Communications, Fremont, CA (US)

( * ) Notice: Subject to any disclaimer, the term of this patent is extended or adjusted under 35 U.S.C. 154(b) by 0 days.

(21) Appl. No.: 09/924,784

(22) Filed: Aug. 8, 2001

(51) Int. Cl.[7] .................................................. G02B 6/00
(52) U.S. Cl. ........................ 385/134; 385/37; 385/12; 385/10
(58) Field of Search ........................... 385/37, 31, 12, 385/134, 10, 13, 123, 135–139

(56) References Cited

U.S. PATENT DOCUMENTS 5,694,501 A  12/1997  Alavie et al.
6,374,015 B1 *  4/2002  Lin ................................ 385/37

OTHER PUBLICATIONS

Dutton, Harry J. R., "Understanding Optical Communication," Prentice Hall PTR, Upper Saddle River, NJ 07458, p. 275–276, 1998.

Lin, Samuel I–En, "Temperature–Compensating Device with Central–Wavelength Tuning for Optical Fiber Gratings," Opt. Eng. 40(5), p. 698–702, May 2001.

* cited by examiner

Primary Examiner—Phan T. H. Palmer
(74) Attorney, Agent, or Firm—Fulbright & Jaworski L.L.P.

(57) ABSTRACT

Temperature compensated fiber stretching is accomplished by amplifying with a unique flexure the relative displacement between a rigid frame and a longitudinal spacing element. For passive compensation, relative displacement results from differential thermal expansion between the frame and the longitudinal spacer. For active thermal compensation and/or for wavelength tuning of an embedded fiber Bragg grating, relative displacement results from combining differential thermal expansion with active feedback length control of the longitudinal spacer. The feedback control can stabilize using length feedback from a displacement sensor or actively control length using temperature feedback, including logic elements, for example algorithms or look up tables. In an optical system, combined passive compensation and active control with flexure amplification provide superior thermal wavelength stability and tuning range. In some embodiments, the rigid frame and the flexure are of the same material and can be formed as a single monolithic piece.

41 Claims, 5 Drawing Sheets

FBG STRETCHING MECHANISM WITH INTEGRATED THERMAL COMPENSATION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Fiber Bragg gratings (FBGs) are important optical elements widely used in various functional devices for dense wavelength-division multiplexing (DWDM) networks, for example FBG-stabilized laser sources and various FBG-based WDMF devices for multiplexers, demultiplexers, and add/drop filters. In these applications of FBGs, a problem arising from changes in the ambient temperature has been observed. Because the spacing of the Bragg grating determines the central wavelength of a reflected optical signal in an optical fiber, have to be carefully designed and accurately manufactured. As with most optical devices, the reflected central wavelength of an FBG varies with the ambient temperature of the device. This is caused only partially by expansion and contraction of the fiber with temperature and consequent change in the period of the refractive index variations in the fiber core. The dominant effect is a variation of the refractive index itself with temperature. These variations, which can be as small as 50 GHz (0.4 nmn), are nevertheless undesirable in view of the narrow channel spacings used in high-performance optical communication systems. Thus, reducing the thermal variability of the FBGs is a key factor to their commercial success in the telecommunication industry.

FBGs can be fabricated by interferometric or phase-mask techniques. However, their packaging is a vital technology in making FBGs suitable for real-world applications. Annealing, laser welding, epoxying, and recoating during fabrication can result in deviation from the desired central wavelength. Thus a packaging device designed with a post-tuning mechanism is necessary. To compensate the FBGs thermal wavelength shift, that mechanism must provide both positive and negative correction. One of the methods to achieve this is to include a prestressed element (stretcher) in the packaging device (see S. I. Lin, "Temperature-compensating device with central-wavelength tuning for optical fiber gratings," Opt. Eng. 40(5), 698–702, May 2001). Although stretching a fiber can be done with practically anything, for example a small motorized translation stage, typically more precise stretching is required.

Mechanical strain (stretching) in the fiber also changes the reflected central wavelength of the FBG. The design of stretchers is based on the effects of both strain and temperature on wavelength shift and hence a dispersion shift. The use of strain (stretch) is also the mechanism for tuning dispersion in FBG devices. One effect is used to provide a proportional offset for the other to ideally produce a net zero wavelength shift across a given temperature range. To calculate this proportional offset, the relevant constants are temperature effects on wavelength shift of an unsupported fiber $\Delta\lambda(T)=+0.01$ nm/° C.; coefficient of thermal expansion for fused silica $=+0.5\ \mu\epsilon/°$ C.; and strain effect on wavelength shift $\Delta\lambda(\mu\epsilon)=+0.001$ nm $/\mu\epsilon$, where the symbol ($\mu\epsilon$) represents parts per million.

Figure 1A:
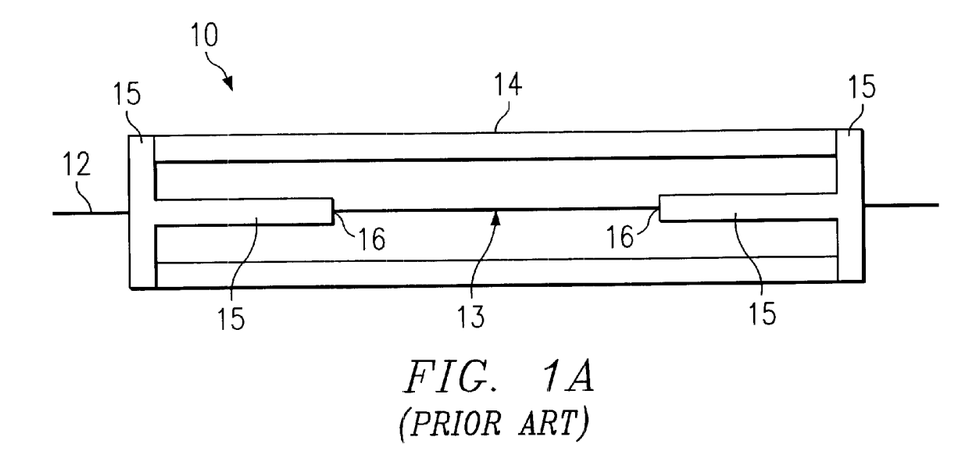
FIG. 1A is a schematic cross-section depicting a fiber installed in a prior art thermally compensated stretcher.

Accordingly, to thermally compensate the fiber, a strain of $\approx-9.5\ \mu\epsilon/°$ C. must be applied to the fiber to produce a near zero wavelength shift. In other words the fiber must be relaxed 9.5 parts per million for every degree C increase of temperature. If a device is constructed that will put tension onto the FBG at low temperatures and relax that tension progressively as the temperature is increased, the two temperature dependent effects can compensate one another. This is commonly done by packaging the fiber with another material that has different thermal expansion characteristics from that of fiber. FIG. 1A is a schematic cross-section depicting a fiber 12 installed in a prior art thermally compensated stretcher 10 (see H. Dutton, "Understanding Optical Communications," Prentice Hall, 1998, 275–276). Fiber 12 including a FBG segment 13 is centered inside a hollow fused silica tube 14. Fiber 12 is bonded to reentrant steel end caps 15 typically using epoxy 16. Steel has a much higher coefficient of thermal expansion than the silica of tube 14 or of fiber 12 itself. Fiber 12 is bonded into steel end caps 15 under tension at the lowest temperature at which the device operates. When the temperature rises, the differential expansion of steel end caps 15 causes the tension in fiber 12 to relax. This variation in tension is arranged to cause wavelength variations in the opposite direction from those caused by normal thermal movement of the unsupported fiber. Both effects balance to produce a substantially stable device without active temperature control. However, the simple stretcher of FIG. 1A has no fine adjustment capability and provides coarse adjustment over only a limited range of tension.

The sensitivity of the reflective spectrum center wavelength of intracore Bragg gratings to the strain and thermal environment to which they are subjected has made them popular as sensors and as tuning elements for fiber and diode lasers. Chirped gratings have been shown to compensate for dispersion experienced by short optical pulses traversing a length of optical fiber. A number of methods of fabricating chirped gratings have been devised, but each grating is limited to a fixed narrow range of dispersion compensation.

Sources of optical fibers with FBGs include the following: TeraXion Inc., 20–360 rue Franquet, Sainte-Foy, Quebec, G1P 4N3, Canada; Southampton Photonics (US) Corporate Office, 170 Knowles Drive, Suite 2, Los Gatos, Calif. 95032; and Redfern Photonics Pty Ltd Headquarters, Suite 212, National Innovation Centre, Australian Technology Park, Eveleigh, NSW, 1430, Sydney, Australia.

Figure 1B:
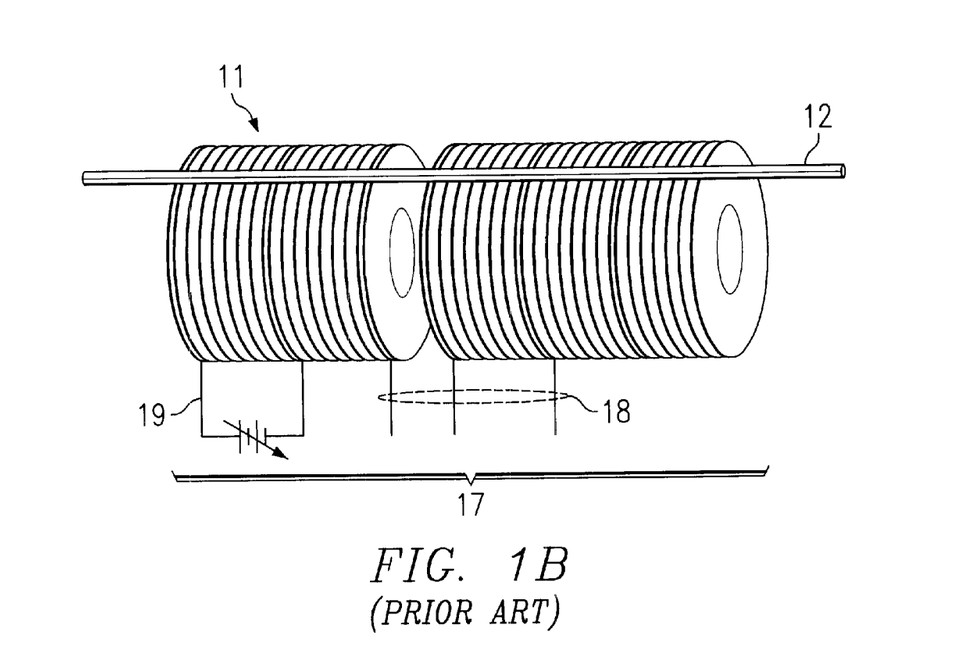
FIG. 1B is a schematic diagram depicting a prior art stretcher in which a Bragg grating attached to a structural element is strained nonuniformly by means of a set of linear actuator elements.

FIG. 1B is a schematic diagram depicting a prior art stretcher 11 in which a Bragg grating attached to a structural element is strained nonuniformly by means of a set of linear actuator elements (see U.S. Pat. No. 5,694,501, issued Dec. 2, 1997 to Alavie et al.). Fiber 12 is coupled to a segmented piezoelectric stack 17 that can be selectively energized at a number of electrodes 18 along the length of the grating. Strain effects can be fine tuned using voltage control 19. However, piezoelectric stacks are capable of inducing strain over only a limited range, and this arrangement can cause strain discontinuities at the interfaces of the piezo elements that create the stack, causing a detrimental effect on the optical signals being compensated.

BRIEF SUMMARY OF THE INVENTION

The present invention is directed to a system and method which is directed to thermal compensation in a fiber stretcher.

Embodiments of the present invention provide technical advantages not available in the prior art. Temperature compensated fiber stretching is accomplished by amplifying with a unique flexure the relative displacement between a rigid frame and a longitudinal spacing element, both in contact with the flexure. For passive thermal compensation, the relative displacement is provided by differential thermal expansion between the rigid frame and the longitudinal spacing element. For active thermal compensation and/or for wavelength tuning when the fiber contains an embedded fiber Bragg grating, the relative displacement is provided by a combination of differential thermal expansion and active feedback control of the length of the longitudinal spacing element, which is a linear actuator. The feedback control can be configured to stabilize actuator length using length feedback from a displacement sensor and/or to actively control length using feedback from a temperature sensor. The feedback loop can include one or more logic elements, for example algorithms or look up tables. In an optical system, combined passive compensation and active control with flexure amplification provide superior thermal wavelength stability and tuning range.

Embodiments of the present invention are compact, rugged, and easily manufacturable. In some embodiments, the rigid frame and the flexure are fabricated from the same material. In further variations, the rigid frame and the flexure are portions of a single monolithic piece of material.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 2:
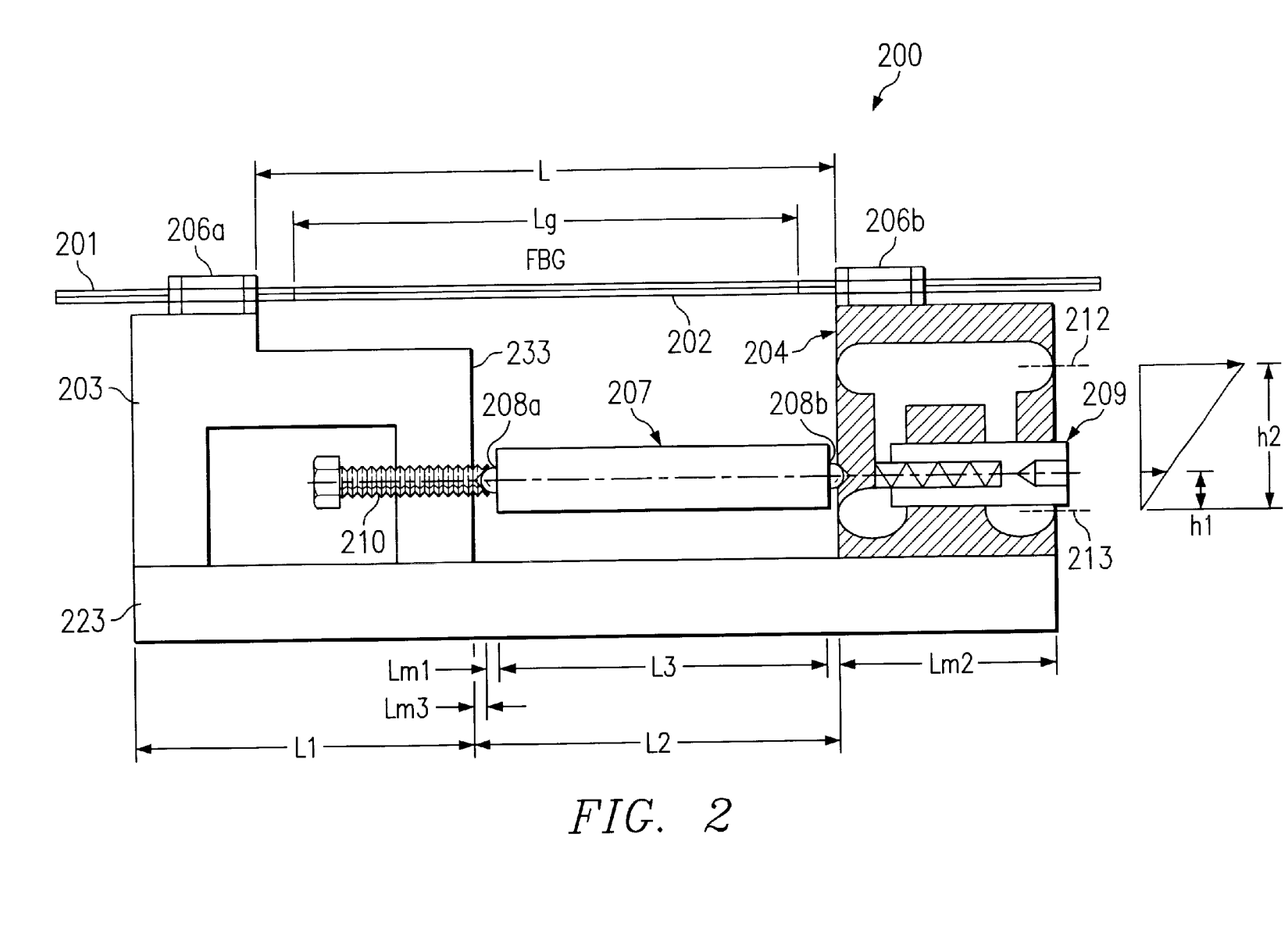
FIG. 2 is a simplified schematic diagram illustrating a thermnally compensated fiber stretcher assembly, in accordance with embodiments of the present invention.

FIG. 2 is a simplified schematic diagram illustrating a thermally compensated fiber stretcher assembly 200, in accordance with embodiments of the present invention. Stretcher assembly 200 includes a rigid frame 203 having a base 223 to which a flexure 204 is rigidly attached. Frame 203, base 223, and flexure 204 can be made from the same material and can optionally be fabricated as an integral monolithic structure. A longitudinal spacing element 207 substantially parallel to base 223 is captured between pivot bearings 208a and 208b attached respectively to vertical surface (in FIG. 2) 233 of frame 203 and to flexure 204. Pivot bearings 208a and 208b are typically configured as ball-in pocket bearings, and are maintained in contact under longitudinal compression by preload 209 and adjusting screw 210. Optionally, pivot bearings 208a, 208b can be flexures. Pivot bearings 208a, 208b transfer only axial force and no moment. An optical fiber 201 typically containing a FBG section 202 of length Lg is oriented longitudinally and fixed on either side of FBG section 202 to stretcher assembly 200 at fiber holders 206a and 206b attached respectively to frame 203 and flexure 204. Optionally fiber holders 206a, 206b are fabricated integrally with monolithic frame 203 and flexure 204. Fiber 201 has a length L between attachment positions at fiber holders 206a, 206b. The chirp section of the fiber is labeled "FBG." The vertical marks on fiber 201 delineate the active chirp section of FBG 202. The most common reason for chirping gratings is dispersion compensation, although not all gratings are chirped. Stretching can be used for dispersion compensation for any fiber that has grating or for any other application that requires stretching or relaxing an optical fiber that has a temperature dependence. This can be used for fibers that are not optical fibers.

In operation, as the temperature increases, a differential thermal expansion occurs between base 223 and longitudinal spacing element 207. Since flexure 204 is preloaded against longitudinal spacing element 207 (through pivot bearing 208b) flexure 204 must bend in order to maintain physical contact at pivot bearings 208a and 208b due to the preloading force. Normally, longitudinal spacing element 207 is selected to have a lower coefficient of thermal expansion than does base 223, in which case a counterclockwise bending of the flexure is achieved by the preloading force on flexure 204 as the temperature increases. Flexure 204 is configured conventionally such that bending occurs predominantly in the thin walled sections adjacent bending planes 212 and 213. Flexure 204 is configured in a parallelogram shape, which is preserved while bending. As the lower portion of flexure 204 rigidly attached to base 223 moves to the right relative to longitudinal spacing element 207, flexure 204 pivots counterclockwise about pivot bearing 208b with which it is held in contact by preload 209 and adjusting screw 210, such that the upper portion of flexure 204 moves substantially parallel to base 223 toward the left relative to longitudinal spacing element 207. This shortens the distance between fiber holders 206a and 206b, thus relaxing the strain of fiber 201. Conversely, as the temperature decreases, the above sequence is reversed, increasing the strain of fiber 201.

The displacement of fiber holder 206b relative to base 223 is larger than the displacement of base 223 relative to longitudinal spacing element 207 by an amplification ratio h2/h1, where h2 is the vertical distance between bending planes 212 and 213 (marking the approximate boundaries of the deformable portion of flexure 204) and h1 is the vertical distance from pivot bearing 208b to lower bending plane 213. In order to achieve the correct thermal compensation for FBG 202, amplification ratio h2/h1 must be properly related to the respective lengths L1 of base 223, L2 of base 223 right, L3 of longitudinal spacing element 207, Lm of combined preload 209, adjusting screw 210, and pivot bearings 208a, 208b; and to the respective coefficients of thermal expansion of these structural elements.

In some embodiments, longitudinal spacing element 207 is simply a passive space holder, for example a rigid rod, which provides passive thermal compensation only. The nominal strain at equilibrium temperature can be factory adjusted. In alternative embodiments, longitudinal spacing element 207 is a linear actuator with feedback stabilized length. The actuator remains essentially a passive element, but only in the sense that feedback from a position feedback sensor (capacitive, LVDT, or other) causes it to maintain a constant length. A piezo actuator or other linear actuator can have an integral displacement sensor and therefore is both a measuring and an actuating device, inherently capable of supplying its own feedback.

In still other embodiments, longitudinal spacing element 207 is a linear actuator actively controlled to provide fine correction to the passive thermal compensation of thermally compensated fiber stretcher assembly 200. Since there are unavoidable nonlinearities in thermal expansion or in delay between thermal expansion of stretcher assembly 200 and wavelength shift response of FBG 202, the passive component of the temperature compensation is insufficient to yield a perfectly flat wavelength response over a wide temperature range. For this reason the present embodiments include an option for an active component in the compensation utilizing a temperature sensor and a factory calibration prior to shipment, employing for example a look up table or an algorithm, that will correct residual thermal effects that cannot be compensated passively. The actuator provides a minimal additional strain offset as a function of ambient temperature, such that the net effect is a desired flat wavelength response across a temperature range.

Since the actuator is not directly attached to the fiber as in prior art devices, corrections generated by actively controlled linear actuator longitudinal spacing element 207 are amplified by a ratio h2/h1 through flexure 204, providing a substantially greater range of displacement than obtainable with conventional devices. Active length control of linear actuator longitudinal spacing element 207 also allows tuning of the center wavelength of FBG 202.

To have thermal compensation normally requires for example materials with dissimilar coefficients of thermal expansion, like steel and aluminum. Passive thermal compensation utilizes two dissimilar coefficients of thermal expansion, namely the frame/flexure 203/204 made of aluminum, and the longitudinal spacing element 207, e.g., piezo having an inherently much different coefficient of thermal expansion. Embodiments of the present invention provide passive dispersion compensation which will compensate for most temperature variations. Additionally, through active actuation of longitudinal spacing element 207, they provide active tuning of the thermal compensation in a passive device. The flexure, instead of being made of multi-metal components, is a single piece made out of aluminum or other metal. It can be essentially a single monolithic machined casting. Advantageously the design can use any of a number of different materials. For example, if steel instead of aluminum is used, then the only change required is the amplification ratio.

Sources of piezo actuators include the following: Peizosystem Jena GmbH, Prussingstrasse 27, D-07745 Jena/Thur., Germany; Physik Instrumente (PI) GmbH & Co., Polytec-Platz 1–7, PO Box 162, D-76337 Waldbronn, Germany; and Burleigh Instruments, Inc., 7647 Main St. Fishers, Victor, N.Y. 14564-8909, U.S.A.

Figure 3:
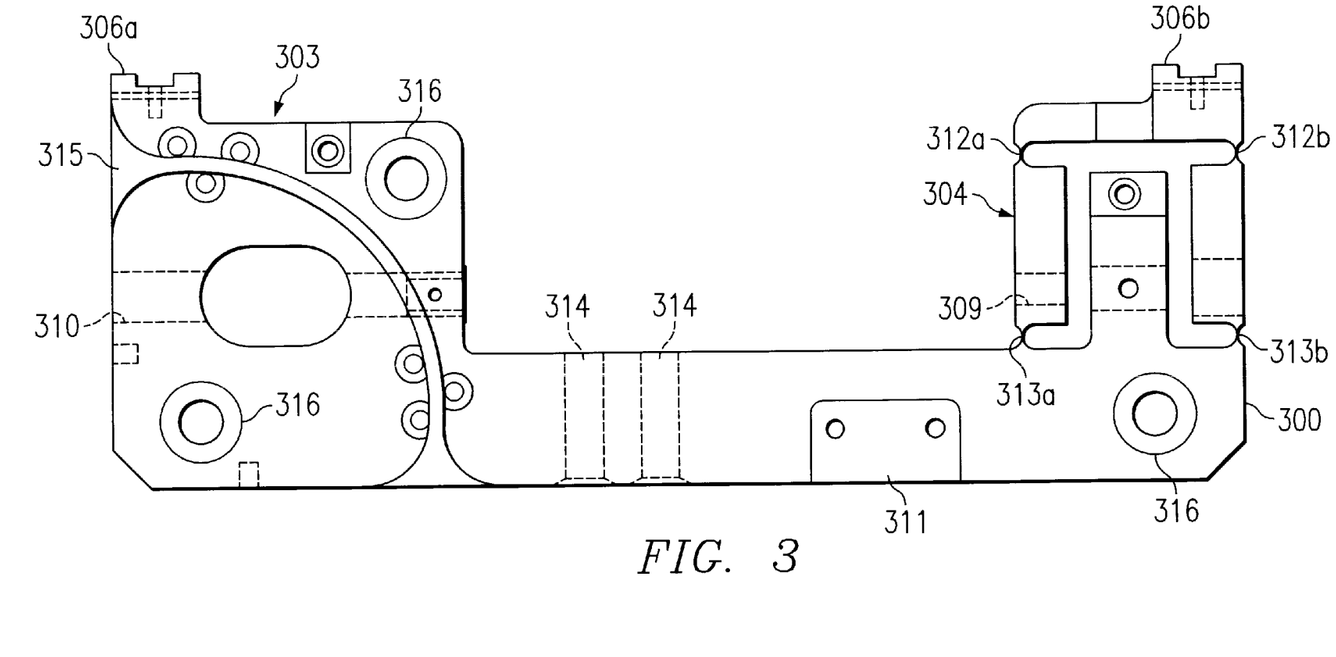
FIG. 3 is a layout view depicting an exemplary integral monolithic frame/flexure mechanism for a thermnally compensated fiber stretcher, according to embodiments of the present invention.

FIG. 3 is a layout view depicting an exemplary integral monolithic frame/flexure mechanism 300 for a thermnally compensated fiber stretcher, according to embodiments of the present invention. Monolithic frame/flexure mechanism 300 is fabricated from a single piece of structural material, for example 7075-T6 aluminum alloy. Fabrication processes can include casting, machining, bending, deforming, and/or various combinations of these. Monolithic frame/flexure mechanism 300 includes a frame portion 303 and flexure portion 304, each having a respective attached fiber holder 306a and 306b. Advantageously, fiber holders 306a and 306b are illustratively integral with monolithic frame/flexure mechanism 300, but can alternatively be fabricated as separate attached components. Monolithic frame/flexure mechanism 300 contains threaded and/or access bores 309 and 310 for installing respectively preload 209 and adjusting screw 210. Flexure portion 304 is conventionally configured with thinned walls 312a, 312b, 313a, and 313b to locate bending planes. Optionally, monolithic frame/flexure mechanism 300 contains a recess 311 for mounting a temperature probe and/or cavity (or cavities) 314 for routing a sensing and control harness to a linear actuator (not shown in FIG. 3). Illustratively, monolithic frame/flexure mechanism 300 incorporates an optional curved groove 315 for routing optical fiber(s). Likewise optional mounting holes 316 are provided for installing monolithic frame/flexure mechanism 300 in an optical system, advantageously through elastomeric mechanical isolators.

Figure 4:
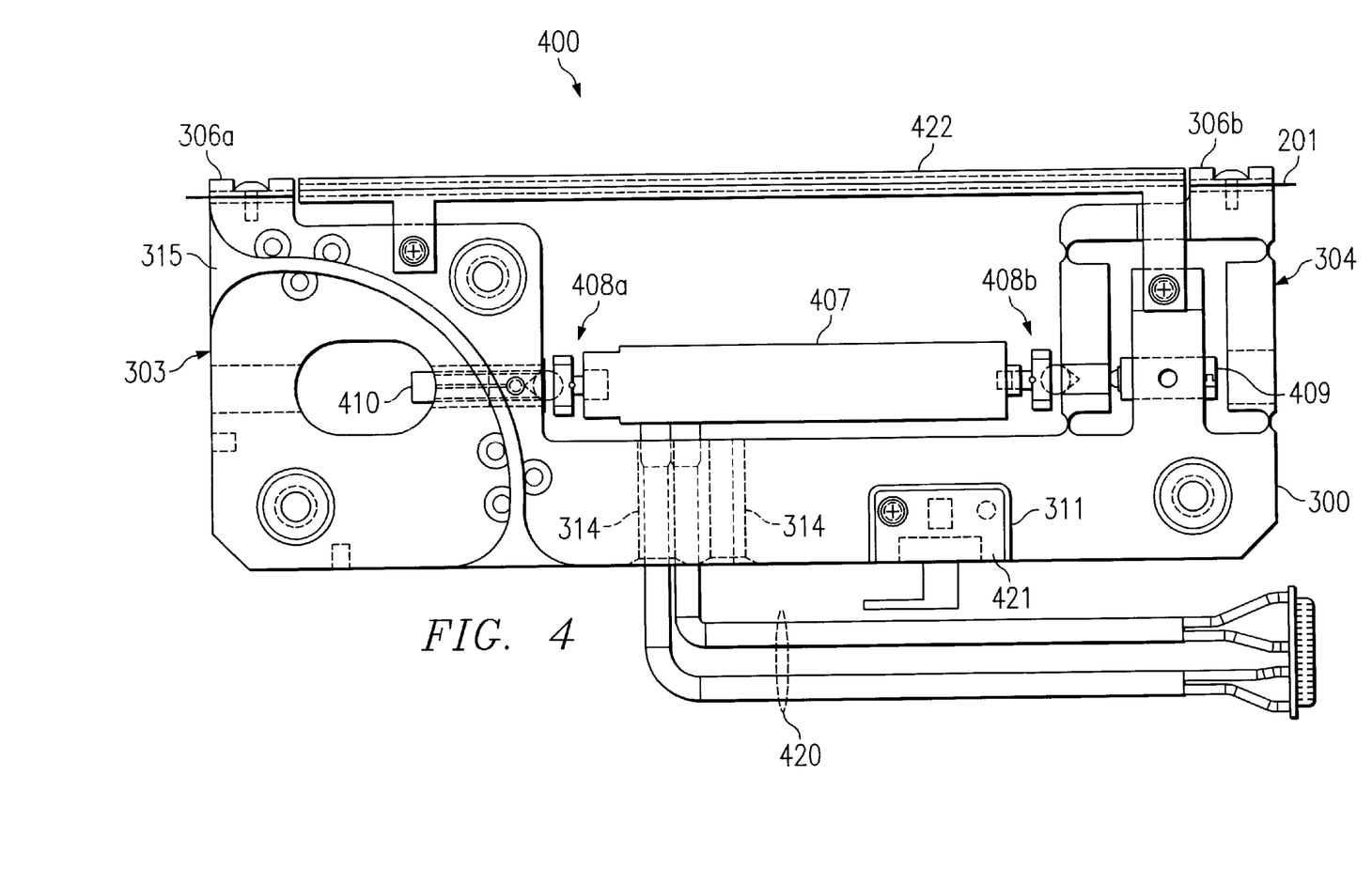
FIG. 4 is an assembly diagram depicting a temperature compensated stretcher assembly incorporating the monolithic frame/flexure mechanism of FIG. 3.

FIG. 4 is an assembly diagram depicting a temperature compensated stretcher assembly 400 incorporating monolithic frame/flexure mechanism 300. Monolithic frame/flexure mechanism 300 includes frame portion 303 and flexure portion 304 attached to either end of fiber 201 through respective fiber holders 306a and 306b. Longitudinal spacing element 407 is held at either end with respective pivot bearings 408a and 408b under compression from respective preload 409 and adjusting screw 410. A sensing and control harness 420 connected with longitudinal spacing element 407 feeds through cavities 314, and temperature probe assembly 421 with attached cable harness is installed in recess 311. Optionally, a non-contacting protective cover 422 is installed over fiber 201.

Figure 5:
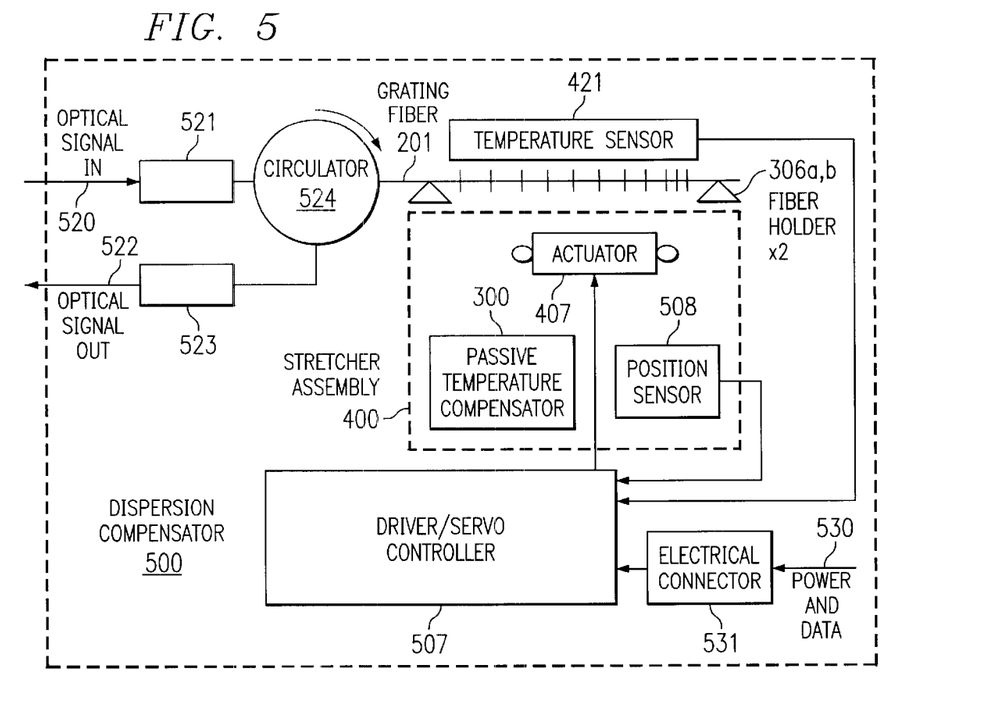
FIG. 5 is a schematic block diagram illustrating a dispersion compensator incorporating a temperature compensated stretcher assembly and interconnected with an optical system.

FIG. 5 is a schematic block diagram illustrating a dispersion compensator 500 incorporating a temperature compensated stretcher assembly 400 and interconnected with an optical system. Monolithic frame/flexure mechanism 300 is attached to fiber 201 through fiber holders 306a and 306b.

Longitudinal spacing element 407 is represented as a linear actuator driven by driver/servo controller 507 in response to feedback from temperature sensor 421 and position sensor 508, which is typically integral with longitudinal spacing element 407. Power and input data are supplied to driver/ servo controller 507 over cable harness 530 through electrical connector 531. Illustratively, fiber 201 is interconnected with an optical system through circulator 524, which is connected with optical input signal 520 and with optical output signal 522 through respective optical fiber connectors or splices 521 and 523.

In operation, an optical input signal 520 enters dispersion compensator 500 through optical fiber connector 521 and is directed by circulator 524 in a clockwise fashion to fiber 201 containing a FBG, which then reflects a dispersion compensated signal back to circulator 524. Circulator 524 directs the reflected dispersion compensated signal, again in a clockwise fashion, to optical output signal 522 through optical fiber connector 523. If the ambient temperature changes, passive temperature compensation is provided through differential thermal expansion between monolithic frame/ flexure mechanism 300 and longitudinal spacing element 407 with amplification h2/h1 through flexure portion 304, as described above. Additionally, fine active temperature compensation is provided by driving linear actuator longitudinal spacing element 407 by driver/servo controller 507 in response to feedback supplied by temperature sensor 421 and position sensor 508. The active displacement of actuator longitudinal spacing element 407 relative to monolithic frame/flexure mechanism 300 is also amplified through flexure portion 304 by ratio h2/h1.

Figure 6:
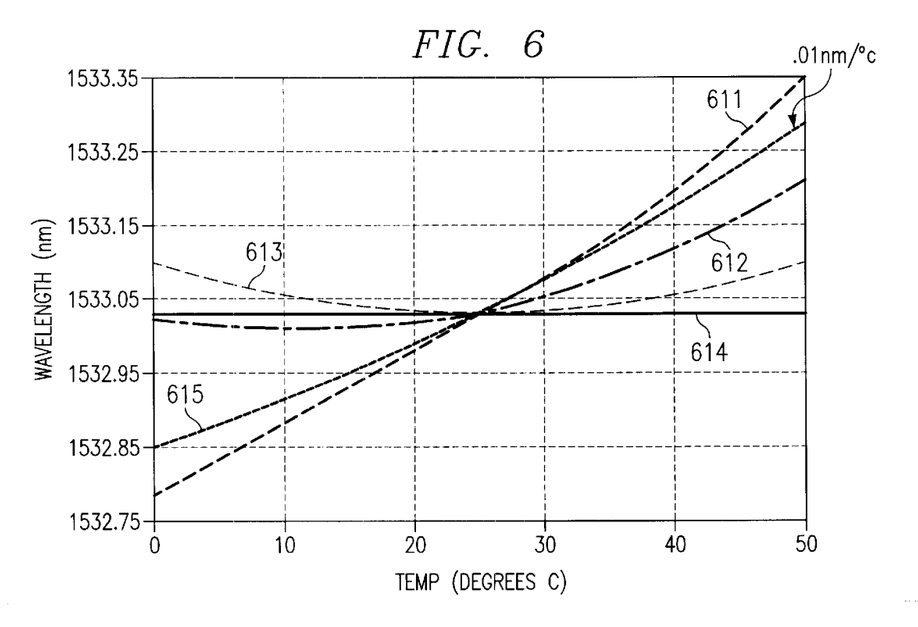
FIG. 6 is a graphic representation illustrating passive thermal compensation under various passive and active stretcher configurations.

FIG. 6 is a graphic representation illustrating passive thermal compensation under various passive and active stretcher configurations. The FBG center wavelength in nm is shown on the vertical axis as a function of temperature in degrees C on the horizontal axis. Flattened curve 614 represents perfect thermal compensation achieved using combined active and passive stretching. Laboratory passive stretcher results are depicted in curves 611 and 612. Extrapolating the data in curves 611 and 612 for a passive stretcher that has an increased flexure amplification ratio yields an optimized passive design, as shown in curve 613. When a slight active component is eventually added, perfect compensation is achieved, as shown in curve 614. The performance for an unsupported fiber is shown for comparison in curve 615. It is noted that for a given amplification, different piezo actuators each have their own expansion characteristics.

Embodiments of the present invention provide technical advantages not available in the prior art. Temperature compensated fiber stretching is accomplished by amplifying with a unique flexure the relative displacement between a rigid frame and a longitudinal spacing element, both in contact with the flexure. For passive thermal compensation, the relative displacement is provided by differential thermal expansion between the rigid frame and the longitudinal spacing element. For active thermal compensation and/or for wavelength tuning of a fiber Bragg grating, the relative displacement is provided by a combination of differential thermal expansion and active feedback control of the length of the longitudinal spacing element, which is a linear actuator. The feedback control can be configured to stabilize actuator length using length feedback from a displacement sensor or to actively control length using feedback from a temperature sensor. The feedback loop can include one or more logic elements, for example algorithms or look up tables. Combined passive compensation and active control with flexure amplification provide superior thermal wavelength stability and tuning range.

Embodiments of the present invention are compact, rugged, and easily manufacturable. In some embodiments, the rigid frame and the flexure are fabricated from the same material. In further variations, the rigid frame and the flexure are portions of a single monolithic piece of material.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed as new and desired to be protected by Letters Patent of the United States is:

1. A thermally compensated assembly for stretching an optical fiber, comprising:
   a rigid frame having a base extending in a longitudinal direction;
   a flexure attached to said base, said flexure connected to a first fiber holder;
   a longitudinal spacing element captured under compression between said rigid frame and said flexure;
   said flexure operable to transfer a relative longitudinal displacement between said base and said longitudinal spacing element into an amplified relative longitudinal displacement between said base and said first fiber holder, such that said longitudinal displacement is amplified by a ratio of dimensions substantially perpendicular to said longitudinal direction.

2. The assembly of claim 1 further comprising a second fiber holder connected to said rigid frame.

3. The assembly of claim 2 operable to stretch a fiber between said first and said second fiber holders.

4. The assembly of claim 3 wherein said fiber is an optical fiber.

5. The assembly of claim 4 wherein said optical fiber contains a fiber Bragg grating.

6. The assembly of claim 5 wherein said fiber Bragg grating is chirped.

7. The assembly of claim 1 wherein said longitudinal spacing element is a linear actuator.

8. The assembly of claim 7 wherein said linear actuator is operable to actively adjust a length in response to feedback from a temperature sensor.

9. The assembly of claim 8 wherein said temperature sensor is operatively interconnected with said linear actuator through a logic element selected from the group consisting of algorithms and look up tables.

10. The assembly of claim 7 Wherein said linear actuator is operable to maintain a stabilized length.

11. The assembly of claim 7 wherein said linear actuator is a piezoelectric actuator.

12. The assembly of claim 11 wherein said linear actuator includes an integral displacement sensor.

13. The assembly of claim 1 wherein said rigid frame and said flexure are made of the same material.

14. The assembly of claim 5 wherein said material is an aluminum alloy.

15. The assembly of claim 13 wherein said rigid frame and said flexure constitute a single monolithic piece of material.

16. The assembly of claim 1 wherein said ratio of dimensions is h2/h1, wherein h2 is the distance between two bend planes of said flexure, and wherein h1 is the distance between said longitudinal spacing element and the closer of said two bend planes of said flexure.

17. The assembly of claim 1 wherein said longitudinal spacing element is compressed by a preload and adjusting screw through pivot bearings.

18. A method of temperature compensation for an optical fiber, said method comprising:
    providing a stretcher assembly having a flexure, a rigid frame, and a longitudinal spacing element;
    attaching said fiber to said flexure and to said rigid frame;
    generating a differential longitudinal displacement between said rigid frame and said longitudinal spacing element;
    amplifying said differential longitudinal displacement through said flexure; and
    applying said amplified differential longitudinal displacement between said flexure and said rigid frame, such that strain is induced in said fiber.

19. The method of claim 18 wherein said longitudinal spacing element is a linear actuator.

20. The method of claim 19 wherein said differential longitudinal displacement is generated by applying a drive signal to said linear actuator.

21. The method of claim 20 wherein said induced strain tunes the wavelength of a fiber Bragg grating embedded in said fiber.

22. The method of claim 21 wherein said fiber Bragg grating is chirped.

23. The method of claim 19 wherein said linear actuator actively adjusts a length in response to feedback from a temperature sensor.

24. The method of claim 23 wherein said feedback includes a logic element selected from the group consisting of algorithms and look up tables.

25. The method of claim 19 wherein said linear actuator is a piezoelectric actuator.

26. The method of claim 19 wherein said linear actuator actively maintains a stabilized length.

27. The method of claim 19 wherein said linear actuator actively adjusts a length in response to feedback from an integral displacement sensor.

28. The method of claim 18 wherein said rigid frame and said flexure are made of the same material.

29. The method of claim 28 wherein said rigid frame and said flexure constitute a single monolithic piece of material.

30. The method of claim 18 wherein said differential longitudinal displacement is generated by differential thermal expansion between said rigid frame and said longitudinal spacing element.

31. An optical system comprising:
    a dispersion compensator operable to induce strain in an optical fiber, said dispersion compensator incorporating a passive temperature compensator, said passive temperature compensator including:
        a rigid frame attached to said optical fiber at a first attachment position;
        a longitudinal spacing element; and
        a flexure attached to said rigid frame and attached to said optical fiber at a second attachment position, said flexure operable to amplify differential displacement between said rigid frame and said longitudinal spacing element and to apply said amplified differential displacement to said optical fiber, such that a strain is induced in said fiber.

32. The optical system of claim 31 wherein said longitudinal spacing element is a linear actuator.

33. The optical system of claim 32 wherein said linear actuator is operable to actively maintain a length in response to feedback from a position sensor.

34. The optical system of claim 32 wherein said linear actuator is operable to actively adjust a length in response to feedback from a temperature sensor.

35. The optical system of claim 31 wherein said flexure and said rigid frame are fabricated from the same material.

36. The optical system of claim 32 wherein said flexure and said rigid frame constitute a single monolithic piece of material.

37. The optical system of claim 31 further comprising a circulator interconnected with said optical fiber.

38. The optical system of claim 37 further comprising an input optical signal and an output optical signal each interconnected with said circulator.

39. The optical system of claim 31 wherein a fiber Bragg grating is embedded in said optical fiber.

40. The optical system of claim 39 wherein said fiber Bragg grating is chirped.

41. The optical system of claim 31 further comprising a plurality of said dispersion compensators.

* * * * *